US005495516A

United States Patent [19]
Lee et al.

[11] Patent Number: 5,495,516
[45] Date of Patent: Feb. 27, 1996

[54] DIAGNOSTIC CHANNEL WAKEUP SEQUENCE FOR NETWORK MANAGED FRACTIONAL T1 OR E1 DIGITAL SERVICE UNITS

[75] Inventors: Seng P. Lee, Cheshire; Joseph S. Byczko, Middlebury, both of Conn.

[73] Assignee: General DataComm, Inc., Middlebury, Conn.

[21] Appl. No.: 257,207

[22] Filed: Jun. 9, 1994

[51] Int. Cl.⁶ .............................. H04M 1/24; H04M 3/08; H04M 3/22
[52] U.S. Cl. ....................... 379/1; 379/2; 379/10; 379/27; 379/29
[58] Field of Search ..................... 379/1, 2, 10, 27, 379/29; 370/13, 15, 110.1, 68.1

[56] References Cited

U.S. PATENT DOCUMENTS

| | | | |
|---|---|---|---|
| 4,860,281 | 8/1989 | Finley | 370/15 |
| 4,991,196 | 2/1991 | Krebs | 379/27 |
| 5,197,062 | 3/1993 | Picklesimer | 370/13 |
| 5,210,740 | 5/1993 | Anzai | 370/13 |
| 5,222,083 | 6/1993 | Khouri | 379/29 |
| 5,276,727 | 1/1994 | Kim | 379/29 |
| 5,301,207 | 4/1994 | Emerson | 370/15 |
| 5,337,306 | 8/1994 | Hall | 370/13 |
| 5,343,461 | 8/1994 | Barton | 370/15 |

*Primary Examiner*—Stephen Chin
*Assistant Examiner*—Vijay Shankar
*Attorney, Agent, or Firm*—David P. Gordon

[57] ABSTRACT

Systems and methods are provided for automatically and remotely establishing a diagnostic channel between a network managed master digital service unit (DSU) and a remote fractional T1 or E1 DSU. In the preferred method, the master DSU sends a priming sequence in all of the DS0s/TS0s of the DS0/TS0 bundle intended for the remote DSU which is comprised of a two second break, followed by a relatively low frequency signal which identifies at least the diagnostic channel for the remote DSU. In response, the remote DSU sends a confirmation signal to the master over the identified diagnostic channel, after which the master DSU can send configuration information over the same diagnostic channel.

21 Claims, 4 Drawing Sheets

DIAGNOSTIC CHANNEL WAKEUP SEQUENCE FOR NETWORK MANAGED FRACTIONAL T1 OR E1 DIGITAL SERVICE UNITS

BACKGROUND OF THE INVENTION

1. Field of the Invention

This invention broadly relates to telecommunications. More particularly, the present invention relates to priming sequences for network managed fractional T1 or E1 digital service units (DSUs). For purposes herein, the term "DSU" will be understood to encompass a channel service unit (CSU).

2. State of the Art

Among the well-defined standards of the telecommunications industry which are commonly tariffed by the telephone companies are the T1 and E1 telecommunications signals. A T1 telecommunications signal is basically a 1.544 MHz digital telecommunications signal which utilizes a frame of one hundred ninety-three bits. Of the one hundred ninety-three bits of the frame, one hundred ninety-two bits are used to transmit twenty-four 64 kbps DS0 bytes, while the remaining bit is used for framing and overhead purposes. An E1 telecommunications signal is a 2.048 MHz signal which utilizes frames of two hundred fifty-six bits, with thirty-two DS0 (TS0) bytes, but does not include a framing/overhead bit. Instead, framing information is carried in time slot 0 (TS0) and overhead in time slot 16 (TS16) of the E1 signal.

In many common applications it is desired that a master DSU which is coupled to the digital network via a T1 or E1 line be able to communicate with a plurality of remote DSUs which may be similarly coupled to T1 or E1 lines. In fact, in a managed network, it is desirable for the master DSU to have a means to be able to configure and manage those remote DSUs. In managing the remote DSUs, a diagnostic channel must be established and utilized. Thus, presently, in order to manage a remote DSU, the master DSU must already be in established contact with the remote DSU as there is no expedient mechanism for finding the diagnostic channel in the bundle of DS0s where the remote DSU is not configured. For new remote installations, it is therefore required that a technician visit the installation site and establish contact with the network manager or master DSU according to known techniques. However, clearly, it would be advantageous to be able to manage a remote DSU without such manual intervention.

SUMMARY OF THE INVENTION

It is therefore an object of the invention to provide an automatic remote mechanism for establishing a diagnostic channel between a network managed master DSU and remote fractional T1 or E1 DSUs.

It is another object of the invention to provide a priming sequence for a fractional T1 or E1 DSU which incorporates an indication of the location of a diagnostic channel therein.

In accord with the objects of the invention, a system and method are provided for automatically and remotely establishing a diagnostic channel between a network managed master DSU and a remote fractional T1 or E1 DSU. According to the method, for each new remote fractional DSU to be configured, the master DSU sends a priming sequence in at least one of the DS0s of the DS0 bundle intended for that remote DSU. The priming sequence is comprised of an intrusive break (e.g., zeros) for a preferably relatively lengthy predetermined period of time, followed by a relatively low frequency signal which identifies at least the diagnostic channel for the remote DSU. If desired, the low frequency signal can also be used to provide configuration information. Alternatively, after the diagnostic channel has been identified, the master can send the configuration information at a higher speed over the diagnostic channel. Preferably, after the diagnostic channel has been established, but prior to the master DSU sending configuration information to the remote DSU, the remote DSU sends a confirmation signal to the master DSU over the established diagnostic channel. After receipt of the confirmation signal, the master DSU sends the configuration information.

In order to ensure system robustness, certain preferred aspects of the method invention are provided. For example, the master DSU is configured to provide the priming sequence in all of the DS0s of the DS0 bundle intended for the remote DSU, and the remote DSU is configured at start-up and continually after that to scan all DS0s for the priming sequence. In addition, after the intrusive break, and prior to the sending of the priming sequence, a low frequency stop bit is utilized. Further, an asynchronous format is utilized in sending the priming sequence, with a low frequency start bit provided before each byte of each low frequency signal, and a low frequency stop bit provided after each byte of the low frequency signal. The intrusive break is preferably on the order of approximately two seconds in length, while the low frequency signal is preferably at a rate of approximately 40 bits per second (bps). The stop bits received at the remote DSU are oversampled relative to 40 bps so that the remote DSU can properly locate the low frequency signal.

The system of the invention closely parallels the method of the invention, and includes a network managed master DSU and a plurality of remote DSUs, all of which are separately coupled to a telecommunications network via T1 or E1 lines. Each DSU typically includes a microprocessor. When a remote DSU is connected to the network, and contact is to be established between the remote DSU and the master DSU in an automatic fashion, upon command of the network manager, the master DSU transmits the wakeup message (priming sequence) to the remote DSU over the DS0 bundle for that remote DSU as described above. The remote DSU utilizes its own microprocessor in order to extract from the priming sequence particular information regarding the location of the diagnostic channel on which the remote DSU is to send and receive diagnostic information. The location of the diagnostic channel is encoded in the priming sequence.

Additional objects and advantages of the invention will become apparent to those skilled in the art upon reference to the detailed description taken in conjunction with the provided figures.

DETAILED DESCRIPTION OF THE PREFERRED EMBODIMENT

Figure 1:
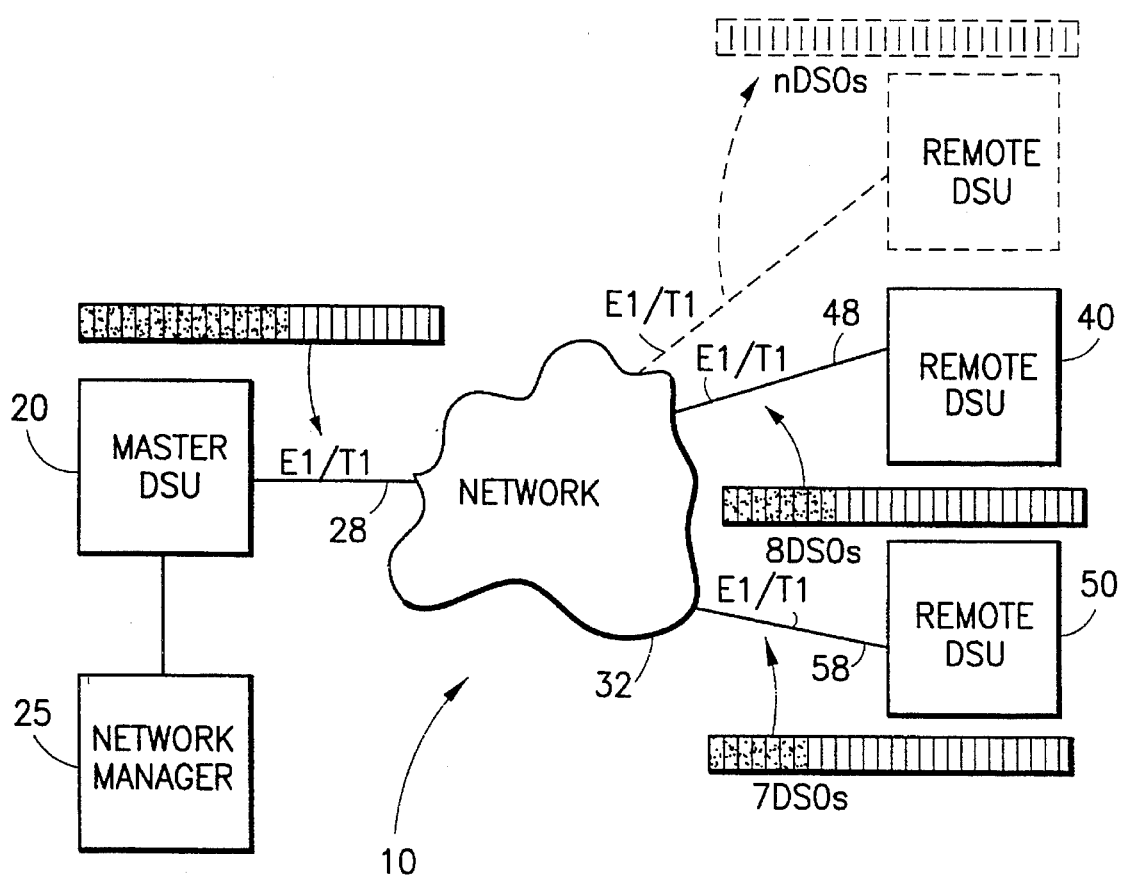
FIG. 1 is a schematic diagram of the system of the invention.

The general system 10 of the invention is seen in FIG. 1 where a master DSU 20 which is under control of a network manager 25 is coupled via an E1 or T1 line 28 to the network 32, and remote DSUs 40, 50 are likewise connected via similar E1 or T1 lines 48, 58 to the network 32. Typically, in North America, Korea and Taiwan, T1 lines are utilized, whereas in Europe and South America, E1 lines are utilized. By way of example only, the master DSU is shown as utilizing fifteen of the twenty-four DS0s of a T1 frame, with a bundle of eight of the DS0s going to the remote DSU 40 as a fractional T1 service and another bundle of seven other DS0s going to the remote DSU 50 as a fractional T1 service. The remaining nine DS0 slots of the T1 frame are shown as being presently unused. However, as indicated in phantom by FIG. 1, the master DSU 20 can service additional remote DSUs. Thus, by way of example, a third remote DSU might require a bundle of four DS0 slots, while a fourth remote DSU might require a bundle of five DS0 slots, thereby utilizing the master DSU to its capacity. It will be appreciated by those skilled in the art, that the one hundred ninety-three bit T1 frame utilized by the master DSU includes one framing/overhead bit as well as the twenty-four DS0 eight bit bytes. It should also be appreciated, that for purposes herein, a "bundle" of DS0s can refer to a single DS0 as well as a plurality of DS0s.

Figure 2:
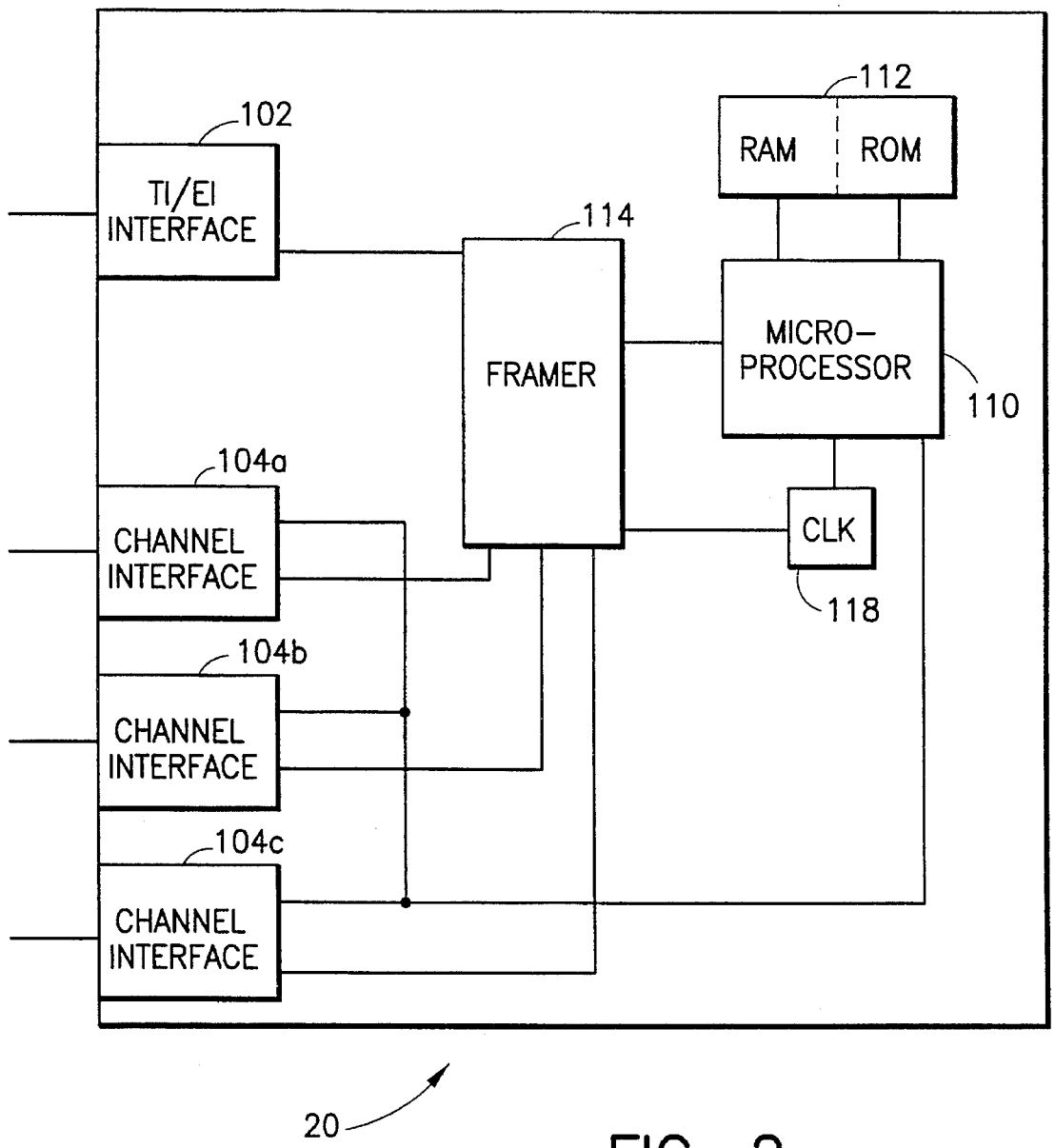
FIG. 2 is a block diagram of a DSU utilized in the method and system inventions.

The internals of the DSUs 20, 40, 50 are well known to those skilled in the art. Thus, only a broad block diagram is shown in FIG. 2. According to the preferred embodiment of the invention, each DSU typically includes a fractional or complete T1 or E1 port/interface circuitry block 102, a plurality of channel port/interface circuitry blocks 104a, 104b, 104c. . . , a microprocessor 110, a nonvolatile RAM and/or ROM 112 coupled to the microprocessor, at least one framer 114 which is effectively a multiplexer/demultiplexer, and clock circuitry 118. Generally, "incoming" data which is being received from the network by the DSU is received at the port/interface circuitry block 102. Based on the frame to which the DSU is synchronized and under control of the microprocessor 110, the data is demultiplexed by the framer 114, and sent to other equipment (e.g., a DTE, terminal, network manager, or additional DSU) via one or more of the channel port/interface circuitry blocks 104a, 104b, 104c. . . . The reverse process is generally followed for "outgoing" data received at the channel port/interface circuitry blocks and intended for sending out over the network. The outgoing data is effectively multiplexed by framer 114 according to the outgoing frame, and forwarded onto the T1 or E1 line by the E1/T1 port/interface circuitry block 102.

Figures 3A, 4:
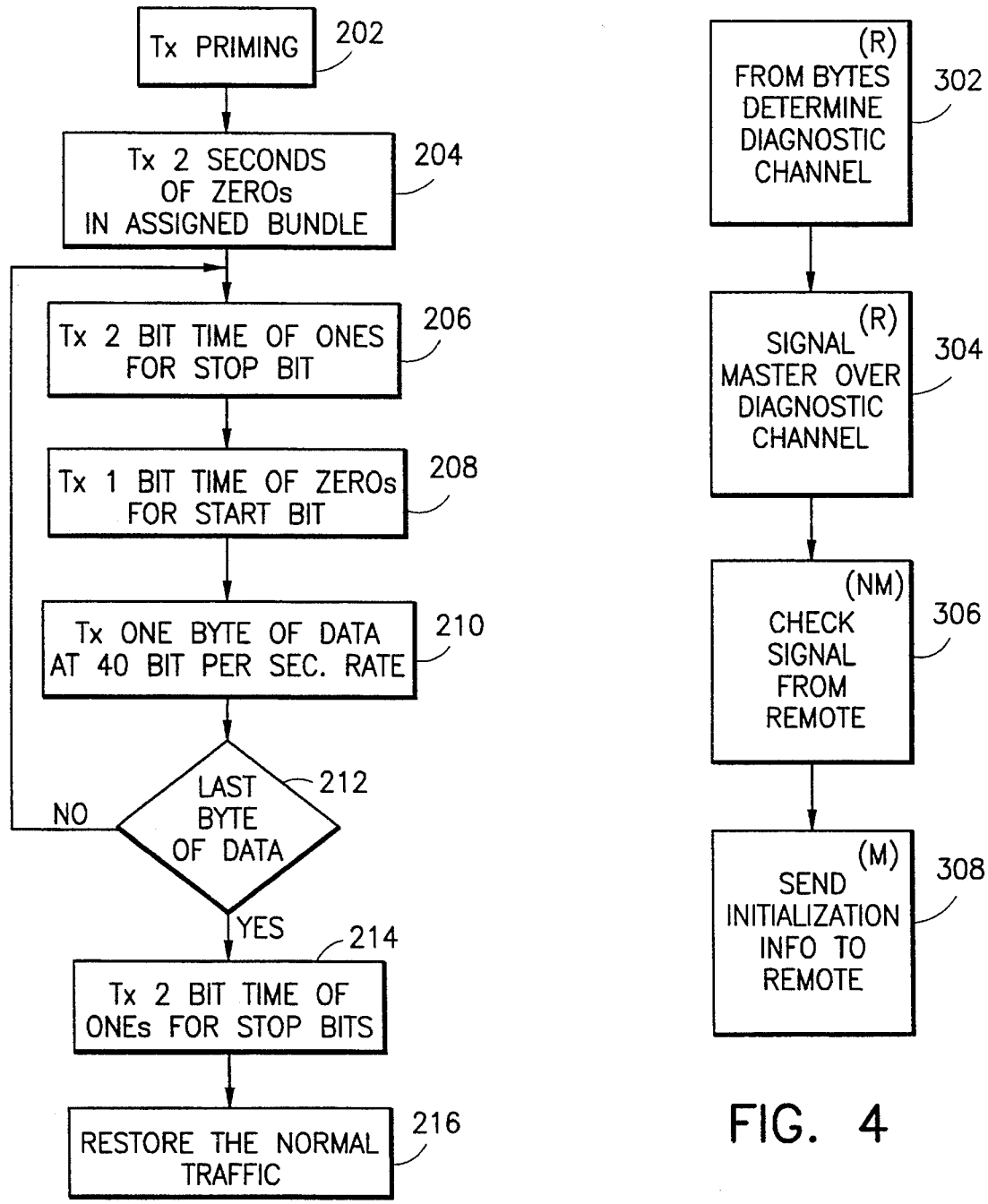
FIG. 3a is a flow diagram of the priming sequence implemented in the microprocessor of the master DSU.
FIG. 4 is a flow diagram of the continued handshake between the master and remote DSUs after the priming sequence.

For purposes of the invention, the critical block of the DSU is the microprocessor 110. In particular, when a network managed fractional E1 or T1 remote DSU is initially installed by providing power (e.g., plugging it into an electrical outlet) and by connecting it to the necessary telecommunication port(s), the remote DSU has no knowledge of its own intended bundle configuration. Without the bundle configuration, diagnostic channel schemes cannot function; and without the diagnostic channel functioning, no channel and bundle configuration can be received. While it is possible for a technician to be sent to the remote DSU to conduct tests and manually configure the remote DSU, in accordance with the invention, the configuration is implemented automatically (upon command of the network manager) utilizing the microprocessors of both the master and remote DSUs. Thus, as seen in FIG. 3a which represents a flow diagram of the microprocessor 110 of the master DSU 20, upon command of the network manager at 202 to install/configure a remote DSU such as DSU 40, the microprocessor of the master DSU (utilizing the program memory ROM 112) sends a priming sequence to the DSU which is being installed/configured. The priming sequence starts at step 204 with the sending of a two second long (utilizing the clock circuitry) intrusive break signal (e.g., bytes of all zeros) in each of the DS0 slots of the T1 frame intended for the remote DSU. The two second long intrusive break signal is terminated at 206 with a stop signal (e.g., byte(s) of all ones) of about fifty milliseconds, which is immediately followed at 208 with a start signal (e.g., all zeros) of about twenty-five milliseconds in length. After the start signal, at 210, the microprocessor of the master DSU sends the first of a series of eleven bytes (which are defined hereinafter) at a rate of forty bps. If it is determined at 212 that the byte is not the last byte, the program continues at step 206 with the sending of a fifty millisecond stop signal, followed at 208 by a start signal of twenty-five milliseconds in length. Then at 210, the next byte is sent. Upon reaching the last of the eleven bytes, the microprocessor at 214 preferably sends a fifty millisecond stop signal and at 216 returns to its normal functioning. It should be appreciated that the start signal which precedes each byte of data and the stop signal which follows each byte of data are part of an asynchronous format of sending data.

According to the preferred embodiment of the invention, the eleven byte wakeup message sent by the master DSU at a rate of forty bits per second to the remote DSU is defined as follows: <p1><p2><sn0> . . . <sn7><checksum>where <> indicates a byte (eight bits) of data. For fractional T1 systems, bytes p1 and p2 are preferably broken down as follows:

| | | |
|---|---|---|
| p1 bit 7: | parity | |
| p1 bit 6:} | Master's Diagnostic Source | (01: FDL - AT&T, |
| p1 bit 5:} | | 10: FDL-ANSI, 11:DCC) |
| p1 bit 4: | 0: initialize | |
| p1 bit 3: | future use | |
| p1 bit 2:} | Master's Channel ID | (001: Channel A) |
| p1 bit 1:} | | (010: Channel B) |
| p1 bit 0:} | | (011: Channel C) |
| p2 bit 7: | parity | |
| p2 bit 6: | future use | |
| p2 bit 5: | future use | |
| p2 bit 4:} | Remote Diagnostic | values 1–24 correspond |
| p2 bit 3:} | Communication Channel | to DSOs 1–24 |
| p2 bit 2:} | DS0 # | value 31 = 11111 = none |
| p2 bit 1:} | | |
| p2 bit 0:} | | |

In addition, the eight bytes sn0 through sn7 provides the serial number of the remote DSU in binary format with byte sn0 being the most significant byte, while the checksum is the message checksum including parity bits but excluding start and stop bits used between the bytes as explained above.

As an explanation of bytes p1 and p2, it should be appreciated that the diagnostic channel as defined by bits 6 and 5 of byte p1 may either constitute the overhead/framing bit of the T1 frame (FDL) according to either of two formats (AT&T and ANSI), or a diagnostic communication channel (DCC) in a DS0 in the T1 frame. In the case of a T1 FDL signal, the diagnostic channel is typically established at a 4 kbps rate, as every other one of the 8 kbps framing/overhead bit of the T1 signal is used for the diagnostic channel. In the case of the diagnostic channel being embedded in a T1 DS0, the diagnostic channel rate is typically established at 2.667 kbps, as every third of a particular one of the eight bits of the designated DS0 in the DS0 bundle is used for the diagnostic channel. It should be appreciated that where an E1 frame is provided, FDL format is accomplished at a 4kbps rate by utilizing every other one of a particular bit in a pre-designated TS0.

Returning to the explanation of bytes p1 and p2, bit 4 of byte p1 is set to zero for network system compatability purposes and indicates that the message is for remote DSU initialization. Also, since the DSU is preferably provided with a plurality of channel/port interface blocks, a plurality of channels can be supported by the system, and bits 2 through 0 of byte p1 is used to establish to which channel the remote DSU is connected. This information is utilized by the master DSU.

With respect to byte p2, bits 4-0 form a five bit word which can identify any of the twenty-four DS0 channels which is to be used by the remote DSU as its diagnostic channel. Where FDL is utilized in a T1 system, bits 4-0 are set to 11111. It should be appreciated that in an E1 system, bits 4-0 can identify all thirty-two TS0s. Thus, where the DCC mode is utilized, bits 4-0 will identify the diagnostic channel, while if FDL mode is utilized, bits 4-0 will identify the pre-designated TS0.

Figure 3B:
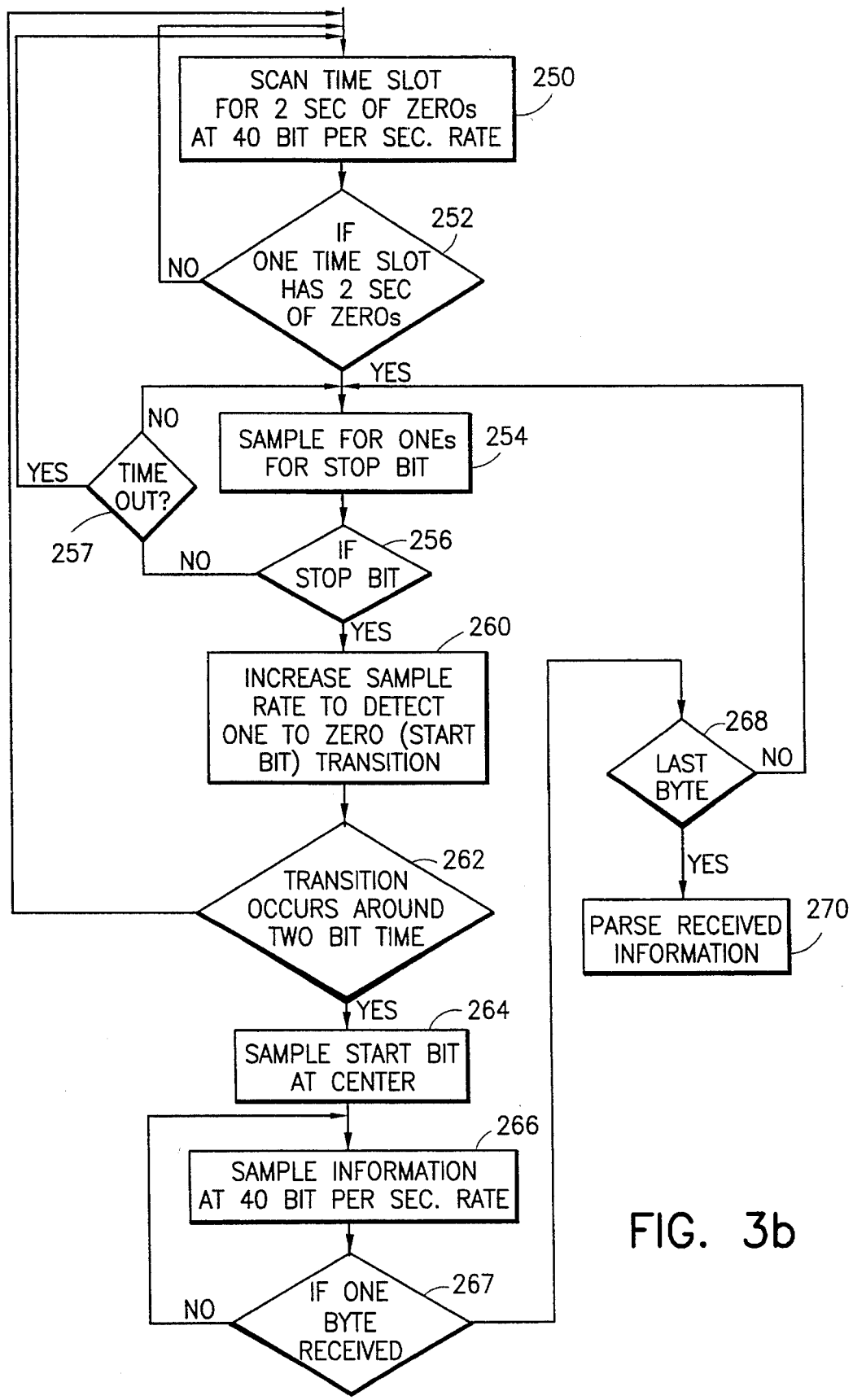
FIG. 3b is a flow diagram of the priming sequence implemented in the microprocessor of the remote DSU.

Turning to FIG. 3*b*, the functioning of the microprocessor of the remote DSU is seen. When the remote DSU is plugged in, the microprocessor of the remote DSU in conjunction with timing circuitry and ROM cause the remote DSU to synchronize to its T1 or E1 line. Then, the microprocessor 250 of the remote DSU repetitively scans the DS0 time slots 0–23 at a rate of forty bits per second. This scanning preferably continually occurs as long as the remote DSU is powered. If any timeslot is found at 252 to have a long period (e.g., two seconds) of a break pattern (e.g., all zeros), then at 254, the microprocessor looks for a stop signal (e.g., all ones) of approximately twenty-five milliseconds. If at 256 the stop signal is not received within a given period of time, the system times out at 257 and returns to scanning for the break signal. However, if the stop signal is received, the sample rate is preferably increased at 260 to at least 200 bps so that the timing of a one to zero transition start bit which occurs at 262 within a fifty millisecond timeframe can be measured carefully. If the transition is not measured, the program returns to 250 so that the DS0 (TS0) time slots are scanned. However, if the transition is measured, its center is determined at 264. Based on the determination of the center of the start bit, the microprocessor of the remote DSU continues at 266 to look for a byte of information (e.g., <p1>). If the byte of information is received, and it is determined at 268 that the byte is not the last byte of the eleven byte message, the program continues at 254 to look for a stop signal, followed by a start bit followed by the next byte of information. This cycle continues until the last byte of information is received. The microprocessor then parses the information at 270 based on a program stored in its ROM by first checking to see whether the checksum is proper, and if so, then to see whether the serial number received matches the serial number programmed into its ROM. If the serial number matches, the remote DSU uses the information contained in bytes p1 and p2 to determine the location of its diagnostic channel.

In accord with a preferred embodiment of the invention, and as seen in FIG. 4, upon determining its diagnostic channel at 302, the remote DSU at 304 signals the master DSU that it is ready to be initialized. The signalling from the remote to the master is accomplished over the assigned diagnostic channel at the diagnostic channel response rate. According to the preferred embodiment, the response sequence is identical to the sequence of information bytes sent from the master to the remote (not using the start and stop bits), except that an extra byte which is set to the value ten (0A hex) which is equal to the number of bytes to follow (excluding the message checksum) is added before byte p1. It should be appreciated that the return signal is accomplished much more quickly than the wakeup signal, as the diagnostic channel rate is 4.0 kbps in the case of FDL (either E1 or T1), and 2.667 kbps in the case of a T1 DCC. Upon receiving the response from the remote DSU, the master DSU forwards the response to the network manager which determines at 306 that the information supplied by the remote DSU is correct. If it is, the network manager then commands the master DSU to send at 308 additional initialization information to the remote DSU, including which DS0s are in the bundle, as well as the full unit configuration.

It should be appreciated that numerous aspects of the wakeup sequence can be accomplished in many different ways. For example, with respect to the sending of the warmup signal, instead of sending the break signal on all of the DS0's of the DS0 bundle intended for the remote, the break signal could be sent on a single DS0, or on the DS0 which is to be used as the diagnostic channel. If it is sent on the DS0 which is to be used as the diagnostic channel, then byte p2 might not be required. Also, instead of utilizing a break signal of two seconds of length, a break signal of different length could be utilized. Further, instead of utilizing start and stop bits prior to and after the sending of each byte of the message, other signalling schemes could be utilized. For example, the frequency of the signal could be changed to distinguish between the break and the actual data, or the data could be sampled at a much higher rate so that the data can be distinguished easily. Further yet, instead of waiting to send the remainder of the configuration information over the diagnostic channel after the remote DSU has responded, the master DSU can send all configuration information at the slower signalling rate, or, after the diagnostic channel has been established could send the remainder of the information on the diagnostic channel without receiving confirmation from the remote DSU that the diagnostic channel has been positively established. It should be appreciated that changes in the sending of the wakeup sequence will typically require corresponding changes in the detection of the wakeup signal.

Changes not related to the sending of the wakeup signal can also be made with respect to the receiving of the wakeup signal and the remote DSU. For example, instead of scanning on all twenty-four T1 DS0 timeslots (or all thirty-two E1 TS0 timeslots) at a slower rate, the remote DSU might only scan on every other DS0 or TS0 timeslot, and/or may scan at higher rates if desired. In addition, rather than looking for a break signal of all zeros, as all zeros may not be permissable in some circumstances due to coding requirements, the remote DSU might look only at only the first or some other bit or bits of the byte which are expected to be zeros rather than at the entire byte. If zeros are received at the tracked bit or bits for the predetermined period of time, then the remote DSU can assume that the break signal is being received. Further, rather than receiving configuration information regarding the DS0 bundle from the master DSU, the remote DSU can determine which DS0s are in its bundle by monitoring the DS0 locations of the wakeup signal (provided the wakeup signal is provided on all DS0 locations of the bundle). Further yet, rather than sending a confirmation signal which includes the entire wakeup signal sent from the master, the confirmation signal could be tailored to send as little or as much information as desired. In fact, no confirmation signal is required.

There have been illustrated and described herein systems and methods for accomplishing wakeup signalling and diagnostics of a network managed fractional T1/E1 digital service unit. While particular embodiments of the invention have been described, it is not intended that the invention be limited thereto, as it is intended that the invention be as broad in scope as the art will allow and that the specification be read likewise. Thus, while the invention was described with reference to T1 and E1 lines, it will be appreciated that it can also apply to fractional T1 and E1 lines where the remote DSUs do not use the capacity of the fractional T1 or E1 line supplied. Also, while the DSUs of the invention were described as having certain circuitry, it will be appreciated that other circuitry can be utilized. For example, instead of a microprocessor, DSPs or other processing means could be utilized. Likewise, instead of a ROM, an EPROM or other nonvolatile memory could be utilized; and instead of a RAM, registers or other memory means could be utilized. Further, while a particular wakeup sequence utilizing a specific number of bytes with information contained in predetermined bit locations in the bytes was described in detail, it will be appreciated that other sequences could be utilized provided that the master unit signals the remote unit as to where in the T1 frame the diagnostic channel for that remote unit is located. In addition, while certain signal rates and lengths of time were described as preferred, it will be appreciated that other rates and lengths of time could be utilized. For example, while the master is described as sending the encoded signal at forty bits per second, and while such lower rate signals will typically be at least an order of magnitude slower than the diagnostic channel rates, higher rates could be utilized if the remote DSU has sufficient computing and processing abilities. Likewise, while periods of two seconds, fifty milliseconds, and twenty-five milliseconds were described for the break signal, and the stop/start signals, clearly the periods can vary, and might at least partially depend upon the rate at which the master DSU is functioning. It will therefore be appreciated by those skilled in the art that yet other modifications could be made to the provided invention without deviating from its spirit and scope as so claimed.

We claim:

1. A method of automatically establishing a diagnostic channel between a network managed master T1 or E1 digital service unit (DSU) and a remote fractional T1 or E1 DSU over a T1 or E1 line, said T1 or E1 line being governed by a frame comprised of a plurality of digital signal level zeros (DS0s) or time slots (TS0s), with a bundle of said plurality of DS0s or TS0s intended for said remote fractional T1 or E1 DSU, said method comprising: a) sending a priming sequence from said network managed master T1 or E1 DSU in at least one of the DS0s or TS0s of the DS0 or TS0 bundle intended for the remote fractional T1 or E1 DSU but not in the DS0s or TS0s of bundles which are intended for other DSUs, said priming sequence including a break signal followed by a signal which encodes at least an indication of the diagnostic channel for the remote fractional T1 or E1 DSU; b) at the remote fractional T1 or E1 DSU, identifying said break signal and said signal which encodes at least an indication of the diagnostic channel, and decoding said signal which encodes at least an indication of the diagnostic channel to identify the diagnostic channel for the remote fractional T1 or E1 DSU.

2. A method according to claim 1, further comprising:

c) sending a confirmation signal from the remote fractional T1 or E1 DSU to the network managed master T1 or E1 DSU over the diagnostic channel.

3. A method according to claim 2, further comprising:

d) at the network managed master T1 or E1 DSU, receiving said confirmation signal; and e) after receiving said confirmation signal, sending configuration information from said network managed master T1 or E1 DSU to said remote fractional T1 or E1 DSU over the diagnostic channel.

4. A method according to claim 1, wherein:

said priming sequence further includes configuration information for the remote fractional T1 or E1 DSU.

5. A method according to claim 1, wherein:

said DS0 or TS0 bundle comprises a plurality of DS0s or TS0s, and said priming sequence is sent in all DS0s or TS0s of the DS0 or TS0 bundle intended for the remote fractional T1 or E1 DSU.

6. A method according to claim 1, wherein:

all DS0s or TS0s of a T1 or E1 frame are scanned by the remote fractional T1 or E1 DSU for said break signal.

7. A method according to claim 1, wherein:

said priming sequence is sent at a relatively low data rate compared to a data rate of said diagnostic channel.

8. A method according to claim 7, wherein:

said relatively low data rate is approximately forty bits per second.

9. A method according to claim 7, wherein:

said remote fractional T1 or E1 DSU oversamples at least a portion of said priming sequence.

10. A method according to claim 1, wherein:

said break signal is substantially two seconds in length.

11. A method according to claim 1, wherein:

said priming sequence includes at least one transition bit between said break signal and said signal which encodes, wherein the remote fractional T1 or E1 DSU oversamples at least said transition bit.

12. A method according to claim 1, wherein:

the remote fractional T1 or E1 DSU is provided with an identification number, and said signal which encodes includes a plurality of bytes incorporating the identification number of the remote fractional T1 or E1 DSU.

13. A method according to claim 1, wherein:

said signal which encodes includes at least five bits for identifying a DS0 or TS0 number for the diagnostic channel.

14. A method according to claim 1, wherein:

said signal which encodes includes at least one bit which identifies whether the diagnostic channel is in one of the plurality of DS0s or TS0s intended for the remote fractional T1 or E1 DSU, or in an overhead bit of the T1 or E1 frame.

15. A method according to claim 1, wherein:

said signal which encodes includes at least one bit which identifies a channel of the network managed master T1 or E1 DSU over which the network managed master T1 or E1 DSU and remote fractional T1 or E1 DSU are communicating.

16. A method according to claim 1, further comprising: prior to said sending a priming sequence step, sending a signal from a network manager to the network managed master T1 or E1 DSU to cause said sending a priming sequence step.

17. A method according to claim 1, wherein:

said signal which encodes comprises a plurality of bytes in an asynchronous format, with each of said plurality of bytes including a start bit and a stop bit.

18. A network managed E1 or T1 telecommunications system which utilizes E1 or T1 telecommunication lines having frames incorporating a plurality of digital signal level zeros (DS0s) or time slot (TS0) signals, said E1 or T1 telecommunications lines being coupled to a telecommunications network, the system comprising:

a) a network managed master digital service unit (DSU) coupled to one of the E1 or T1 telecommunication lines; and b) a first remote DSU coupled to one of the E1 or T1 telecommunication lines, wherein said network managed master DSU includes a first processing means for sending a priming sequence from said network managed master DSU in at least one DS0 or TS0 of a DS0 or TS0 bundle intended for said first remote DSU but not in the DS0 or TS0 bundles intended for other DSUs, said priming sequence including a break signal followed by a signal which encodes at least an indication of a diagnostic channel for said first remote DSU, and said first remote DSU included a second processing means for recognizing said break signal and for decoding said signal which encodes, such that said diagnostic channel is identified.

19. A system according to claim 18, wherein:

said second processing means includes means for sending a confirmation signal from said first remote DSU to said network managed master DSU over said diagnostic channel.

20. A system according to claim 18, further comprising:

c) network manager means coupled to said network managed DSU, for instructing said network managed DSU to send said priming sequence to said first remote DSU.

21. A system according to claim 18, further comprising: d) a second remote DSU coupled to one of the E1 or T1 telecommunication lines, wherein, said first processing means sends a second priming sequence from said master DSU in at least one DS0 or TS0 of a second DS0 or TS0 bundle intended for said second remote DSU, said second priming sequence including a break signal followed by a second signal which encodes at least an indication of a diagnostic channel for said second remote DSU, and said second remote DSU includes third processing means for recognizing said break signal and for decoding said second signal which encodes, such that said diagnostic channel for said second remote DSU is identified.

* * * * *